United States Patent [19]

Manring

[11] Patent Number: 5,324,790
[45] Date of Patent: Jun. 28, 1994

[54] ESTERIFICATION OF CARBOXYLATE CONTAINING POLYMERS

[75] Inventor: Lewis E. Manring, Washington, W. Va.

[73] Assignee: E. I. du Pont de Nemours and Company, Wilmington, Del.

[21] Appl. No.: 953,420

[22] Filed: Sep. 29, 1992

[51] Int. Cl.$^5$ .......................... C08F 8/14; C08F 20/06; C08F 2/10

[52] U.S. Cl. .............. 525/329.9; 525/329.8; 525/330.1; 525/330.5; 525/330.6; 525/333.5; 525/333.6; 525/343; 525/378; 525/379; 525/380; 525/333.3; 525/535; 525/540

[58] Field of Search ............ 525/378, 380, 329.9, 525/330.1, 379, 329.8, 343

[56] References Cited

U.S. PATENT DOCUMENTS

| | | | |
|---|---|---|---|
| 3,544,499 | 12/1970 | Hatch | 260/29.6 |
| 3,804,797 | 4/1974 | Broxterman et al. | 260/29.6 |
| 3,903,056 | 9/1975 | Schmidt et al. | 260/78.5 |

OTHER PUBLICATIONS

K. Williams, et al., Synthesis, 727–728 (1974).
I. Gan et al., Synthesis, 494–495 (1973).
R. C. Fuson, *J. Am. Chem. Soc.* 61, 1290 (1939).
D. Van Meirvenne, et al., Makromol. Chem., Rapid Commin., vol. 8, pp. 519–522 (1987).
A. T. Lawson, et al., J. Chem. Soc., vol. 53, pp. 624–636 (1988).
K. Yamauchi, et al., J. Org. Chem. vol. 44, pp. 638–639 (1979).
H. Ohtani, et al., J. High Res. Chromatog., vol. 14, pp. 388–391 (1991).

*Primary Examiner*—Fred Zitomer

[57] ABSTRACT

A process for esterifying a polymer containing carboxyl(ate) groups, by maintaining the polymer at 0° C. to 200° C., where the counterion for the carboxylate groups is a selected ammonium or sulfoxonium ions. Such processes are useful for preparing improved films and coatings, particularly automotive coatings.

13 Claims, No Drawings

ESTERIFICATION OF CARBOXYLATE CONTAINING POLYMERS

BACKGROUND

This invention concerns a process for esterifying a carboxylate containing polymer, by reacting selected ammonium or sulfoxonium salts of the carboxylate groups to effect esterification.

Carboxylate containing polymers are often used in products that are in water solution, dispersion, or emulsion, where the carboxylate groups may help solublize or stabilize such mixtures. Such polymers are used for coatings, adhesives, photo and thermal resists. However, once the water is removed from the polymer, it is often desirable to somehow remove or convert the carboxylate groups into less polar moieties to reduce the effect of water on the resulting polymer (e.g., less water swell), or to help coalesce the polymer into a uniform film by removing highly polar regions made up of carboxylate salts. The removal or conversion of carboxylate groups should take place when desired, after most of the water has been removed, and the process should preferably be efficient and proceed under relatively mild conditions.

A. T. Lawson, et al., J. Chem. Soc., vol. 53, p. 624–636 (1888) and R. C. Fuson et al., J. Am. Chem. Soc., vol. 61, p. 1290 (1939), report that tetramethyl ammonium ions esterify certain carboxylate ions. K. Yamauchi, et al., J. Org. Chem., vol. 44, p. 638–639 (1979) report that trimethylsulfonium hydroxide esterifies carboxylic acids. Polymers are not mentioned in any of these papers.

U.S. Pat. Nos. 3,544,499, 3,804,797 and 3,903,056 describe the use of sulfonium salts of carboxyalate containing polymers for making such polymers less hydrophilic (more hydrophobic). No mention is made of the use of ammonium or sulfoxonium salts.

H. Ohtani, et al., J. High Res. Chromatog., vol. 14, p. 388–391 (1991) report the use of tetramethylammonium hydroxide as an alkylating agent to form methyl esters of the carboxylic acids residues present in liquid crystalline polyesters when such polyesters are analyzed by pyrolysis-gas chromatography. No mention is made of esterifying a polymer which contains carboxyl(ate) groups.

SUMMARY OF THE INVENTION

This invention concerns a process for forming alkyl esters in polymers, comprising, maintaining a polymer containing carboxylate ions, whose counterions are esterifying ammonium or sulfoxonium ions at a temperature of about 0° C. to about 200° C. It has been found that when the counterion (positive ion) of the carboxylate anion is an ammonium or sulfoxonium cation the salt of the cation is relatively stable in water, but efficiently esterifies the carboxylate group under relatively mild conditions in the substantial absence of water.

DETAILS OF THE INVENTION

The overall reaction which takes place during the process can be represented by the equation

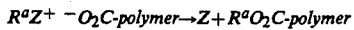

$$R^a Z^+ \ ^-O_2C\text{-polymer} \rightarrow Z + R^a O_2 C\text{-polymer}$$

where $R^a$ is alkyl or substituted alkyl, Z is a neutral Compound which contains all of the ammonium or sulfoxonium ion except the group $R^a$, and the starting carboxylate ion and final ester are bonded to a polymer.

None of the ammonium or sulfoxonium ions herein have a hydrogen atom attached to the atom that bears the positive charge. Thus all the useful ammonium ions herein are quaternary ammonium ions, not protonated ammonia or primary, secondary or tertiary amines. At least one of the groups attached to the atoms that bears the positive charge of the ammonium or sulfoxonium ion is an alkyl or substituted alkyl group. The alkyl group, and phenyl group if present, may be substituted by a group which does not interfere with the esterification reaction. In some instances (see below) the substituents may affect the reactivity of the onium ion towards esterification of the carboxylate group. Suitable substituents include, but are not limited to, alkyl, aryl, ether, halo, ester, and amino.

In the presence of large amounts of water or other strongly hydrogen bonding solvents such as alcohols, particularly the lower alcohols, the esterification reaction is slow or does not occur at detectable levels. It is believed that solvation of the ammonium or sulfoxonium ion and/or carboxylate ion by water or other hydrogen bonding compounds slows the esterification reaction. As the amount of water or other hydrogen bonding solvent decreases, the rate of the esterification reaction increases. It is difficult to remove the last traces of water from the carboxylate salts, since the water molecules (or other hydrogen bonding compounds) strongly solvate the carboxylate salts. Thus, it is believed that in most instances, the esterification reaction occurs in the "substantial absence" of water or other hydrogen bonding compounds, but the complete absence of water or other hydrogen bonding compounds is usually not attained while esterifying, and is probably not necessary.

The amount of water or other hydrogen bonding compounds that may be present during the esterification reaction depends on several interrelated factors, such as the inherent reactivities of the particular carboxylate ion and the particular ammonium or sulfoxonium ion, and the temperature at which the process is carried out. The higher any particular reactivity, or the higher the temperature, the more water may be present, and vice versa. The particular combination of conditions necessary for esterification for any given system is readily determined (see below), and some of these combinations are illustrated in the Examples herein.

The inherent reactivity of the carboxylate ion towards esterification by an ammonium or sulfoxonium ion is believed to be related to the pKa of the conjugate acid of the carboxylate ion. Thus, the higher the pKa of the conjugate acid in water, the more reactive the carboxylate ion will be. It is therefore preferred if the conjugate acid of the carboxylate ion has a pKa of 0 or more, more preferably 2 or more.

An important factor affecting the reactivity of the ammonium or sulfoxonium ion is whether the groups directly attached to the atom bearing the positive charge of the ion are relatively electron donating or electron withdrawing compared to an unsubstituted alkyl group. Thus, electron withdrawing groups such as phenyl, and p-chlorophenyl will make the ion more reactive, and the more there are of such groups, the more reactive the ion will become. Electron donating groups such as p-N,N-dimethylaminophenyl and ethoxymethyl will tend to slow the rate of reaction of the ion. Extremely reactive ions will tend to react with water to form alcohols and the corresponding neutral compound from the remainder of the ammonium or sulfoxonium ion.

It is believed that the relative reactivities of the (substituted) alkyl groups attached to the positively charged atom of the ammonium or sulfoxonium ion is similar to their relative reactivities in so called $S_N2$ displacements. Such relative activities are known to the art skilled, see for example J. B. Hendrickson, et al., "Organic Chemistry", 3rd Ed., McGraw-Hill Book Co., New York, 1970, p. 390, Table 10–5.

Ammonium or sulfoxonium ions that are significantly unstable in the presence of water are not included in the present invention. Ammonium or sulfoxonium ions that are too unreactive to esterify carboxylate ions in the substantial absence of water are also not included within the present invention. The following simple test may be used to determine if any particular ammonium or sulfoxonium ion is included within the present invention:

A random copolymer (0.2g) made of about 33 mole percent methacrylic acid and about 67 mole percent ethyl acrylate is mixed with 2mL of water, and an equivalent amount of a basic salt of the ammonium or sulfoxonium ion such as the hydroxide or bicarbonate (see Examples 1 and 9). The polymer is allowed to dissolve by stirring 12-24 hrs at ambient temperature. A film is made from the solution (if the polymer has precipitated from solution at this point, the ammonium or sulfoxonium ion is too reactive) of the polymer and an infrared spectrum is obtained, preferably without delay. If the polymer is not at least partially (20 mole percent) esterified at this point (the ammonium or sulfoxonium ion would be included herein if it was) the polymer may be heated at up to 180° C. under nitrogen for up to 48hr. If the polymer is not at least 20 mole percent esterified at this point (as judged from the IR spectrum, or more exactly by an acid-base titration of the polymer), the particular ammonium or sulfoxonium ion is not included herein. The techniques used in this determination, including film formation, esterification, and measuring IR spectra, are illustrated in Examples 1 and 9.

Suitable types of cations that are useful herein include, but are not limited to, quaternary ammonium ions and sulfoxonium ions. Specific cations that are useful herein include, but are not limited to $R^1R^2R^3R^4N^+$ where $R^1$, $R^2$ and $R^3$ are independently alkyl containing 1 to 6 carbon atoms and R4 is phenyl or alkyl containing 1 to 6 carbon atoms; and $R^5R^7R^7SO^+$ where $R^5$, $R^6$ and $R^7$ are independently alkyl containing 1 to 6 carbon atoms. Preferred specific cations are tetramethylammonium, phenyltrimethylammonium, trimethylsulfoxonium, and (methoxymethyl)triethylammonium.

The ammonium and sulfoxonium cations of the invention may be included in molecules that contain one or more cations per molecule. If more than one cation is present per molecule, the "poly-cation" may act a crosslinking agent if either the polymer and/or the "poly-cation" is tri- or higher functional. For example, assume an ammonium ion has the formula $A_3N^+XN^{+A3}$, where each A is an alkyl group, and X is an alkylene group that is bound to (or connects) the two nitrogen atoms. If both nitrogen onium ions were to esterify one carboxylate ion each, and the esterfication in both cases were carried out by X, the polymer would become crosslinked, assuming each polymer chain has three or more esterified carboxylate ions. Thus, in order to efficiently crosslink a polymer, the group(s) connecting the cations should preferably be more reactive towards esterification than the other groups bound to the cation atoms with the positive charges.

In one preferred embodiment the polymer has more than two carboxyl(ate) groups and the ammonium or sulfoxonium ion is difunctional. This will cause crosslinking. In another preferred embodiment the ammonium or sulfoxonium ion is monofunctional. In this case, simple esterification of the carboxyl(ate) groups takes place. In another preferred embodiment the polymer has two carboxyl(ate) groups, preferably end groups, and the ammonium or sulfoxonium ion is difunctional. In this instance, chain extension via esterification takes place.

Any polymer containing carboxyl(ate) groups from which the ammonium or sulfoxonium salt may be formed is useful in the instant process. By containing carboxyl(ate) groups means that these groups are bound to the polymer. In general, the carboxylate salts of the ammonium or sulfoxonium ion may be formed by reacting the carboxylic acid form of the carboxyl(ate) group with a basic salt of the ammonium or sulfoxonium ion such as the hydroxide or bicarbonate. This is most conveniently done in a solvent which dissolves the basic ammonium or sulfoxonium salt and swells or dissolves the polymer and/or its ammonium or sulfoxonium salt. For polymers with relatively high carboxyl(ate) content, water or the lower alcohols are usually suitable. Suitable types of polymers include, but are not limited to, acrylics, styrenics, polyesters, polyamides, polyimides, and polyolefins. Especially preferred polymers are acrylic and styrenic polymers, and acrylicstyrenic copolymers. The synthesis of carboxyl(ate) containing polymers suitable for use herein is known, and many of them can be bought.

By an acrylic polymer is meant a polymer wherein 10 mole percent or more of the repeat units are acrylic acid and/or methacrylic acid and their derivatives. By acrylic derivatives herein are meant common derivatives of carboxylic acids such as, but not limited to, esters, amides, acyl halides, carboxylate salts (including ammonium and sulfoxonium ion containing carboxylates) and nitriles.

By a styrenic polymer is meant a polymer wherein 10 mole percent or more of the repeat units are styrene, and/or alpha-methylstyrene and their derivatives. By derivatives are meant substituents on the phenyl ring such as methyl, halo, amino and carboxyl(ate). A polymer may contain a combination of acrylic and styrenic monomers.

The esterification process is carried out at a temperature of about 0° C. to about 200° C., preferably about 15° C. to about 150° C. and most preferably about 25° C. to about 130° C. The higher the temperature the faster the esterification reaction will proceed. The polymer should be stable at the process temperature, and if the polymer is sensitive to oxygen at higher temperatures, an inert atmosphere, such as nitrogen, can be used.

The process described herein is useful in coatings, particularly coatings applied to metals, such as automotive coatings and appliance coatings. Carboxylate containing polymers are used in such coatings, particularly when the solvent is water based. The carboxylate groups in these polymers tend to make the polymers water soluble or at least help stabilize dispersions or emulsions of the polymers in the water. Carboxylate containing polymers may also be used as surfactants for stabilizing emulsions of other polymers. However, when the coating is applied these carboxylate groups tend to retard the coalescence of less polar polymers of the coating, and also usually make the coating itself more water sensitive. Therefore after the coating has been applied and substantially dried, it would be preferable if the carboxylate group could be converted to less polar groups. The instant process does that by converting the carboxylate groups to the less polar, less hygroscopic, ester grouping, while not affecting the carboxylate group before the coating is applied, since a large amount of water is then present. The esterification can be done under relatively mild conditions after the coating is substantially dry, the temperature required being dependent principally on the onium ion present, and the rate of reaction that is needed.

If an ammonium or sulfoxonium ion is used which is di- or higher functional the resulting coating, after esterification, may be crosslinked. This is sometimes desirable, since crosslinking often increases hardness and improves solvent resistance.

This invention also includes an aqueous based coating composition which comprises polymeric carboxylate groups wherein the counterion is an esterifying onium ion. All of the preferred compositions and preferred conditions described above for the esterification process apply also to this coating composition.

EXAMPLES

The following abbreviations are used in the examples:
MAA=methacrylic acid
MMA=methylmethacrylate
EA=ethylacrylate
TEPAOH=triethylphenylammonium hydroxide
TMPAOH=trimethylphenylammonium hydroxide
TMSOOH=trimethylsulfoxonium hydroxide TMPAOH was prepared by addition of excess silver oxide to a solution of trimethylphenylammonium bromide in methanol. The concentration of TMPAOH (1.1 molar) was determined by dilution in water and titration with HCl (phenolphthalien end point).

The copolymer used in examples 1–10 contains 66% ethyl acrylate (EA) and 33% methacrylic acid (MAA). The initial copolymer (a suspension in water, 29.7% solids) has a molecular weight of >500,000. An FTIR of the initial polymer (cast on $CaF_2$ from methanol) shows relevant bands at 1735 cm.$^{-1}$ (ethyl ester), 1705 cm.$^{-1}$ (carboxylic acid) and 3100–3500 cm.$^{-1}$ (OH from water and carbonoxylic acid).

Example 1

To a small vial was added 1mL water, 193mg of the EA/MAA copolymer suspension ($2.2 \times 10^{-4}$ equivalents of carboxylic acid), and 200mL of 1.1M TMPAOH in methanol ($2.2 \times 10^{-4}$ equivalents of TMPAOH). Neutralization of the carboxylic acid sites with TMPAOH made the polymer water soluble.

The carboxylate CO stretch of the neutralized polymer (film cast on $CaF_2$ from water) shifted from 1705cm$^{-1}$ to 1575cm$^{-1}$. IR absorbance from 3100–3500cm $^{-1}$ is due to water retained in the ionic polymer. The IR also contained a shoulder at 3030cm$^{-1}$ due to the aromatic C—H groups in the TMPA cation.

Heat treatment of a film of TMPAOH neutralized polymer at 130° C. for 30 minutes completely converted the TMPA-carboxylate to methyl ester. This fact was established by loss of the carboxylate band at 1575cm$^{-1}$, increased ester absorbance at 1735 cm.$^{-1}$ (now a combination of methyl and ethyl ester) and loss of the residual water. The ester absorbance increased from 0.98 absorbance units to 1.67 absorbance units, consistent with complete conversion of the TMPAOH neutralized carboxylates to methyl ester groups. The dimethylaniline by-product diffused out of the film as evidenced by the loss of the shoulder at 3030cm$^{-1}$.

Example 2

A film similar to the one described in Example 1 was heated to 120° C. in an FTIR instrument. Complete conversion of the TMPA-carboxylate to methyl ester occurred before the apparatus reached 120° C.

Example 3

A film similar to the one described in Example 1 was heated to 100° C. in an FTIR instrument. Complete conversion of the TMPA-carboxylate to methyl ester occurred in ~12 mins. The ester absorbance increased from 0.74 absorbance units to 1.14 absorbance units, consistent with complete conversion of the TMPAOH neutralized carboxylates to methyl ester groups.

Example 4

A film similar to the one described in Example 1 was heated to 80° C. in an FTIR instrument. The apparatus required about 5 mins. to heat from room temperature to 80° C. and ~70% of the TMPA-carboxylate is converted to methyl ester in ~20 mins. The ester absorbance increased from 0.5 absorbance units to 0.7 absorbance units, consistent with complete conversion of the reacted TMPAOH neutralized carboxylates to methyl ester groups.

Example 5

The TMPAOH neutralized EA/MAA copolymer solution described in Example 1 was heated to 100° C. (boiling water) for 30 mins. under conditions where the solvent could not evaporate. A film of the heated solution was cast on $CaF_2$. The carboxylate CO stretch at 1575 cm$^{-1}$ had not changed in intensity relative to the unheated solution. This example demonstrated that the cationic esterification described in Examples 1–4 is preceded by film drying. Therefore, the aqueous polymer solution excellent shelf life and the esterification will not occur until the water is substantially removed.

Example 6

A film similar to the one described in Example 1 was left a room temperature for 8 days. FTIR analysis indicated no conversion of the TMPA-carboxylate to methyl ester.

Example 7

A film similar to the one described in Example 1 was placed under vacuum for 4 days at room temperature. During this period, ~40% of the TMPA-carboxylate is converted to methyl ester. The ester absorbance increases from 0.23 absorbance units to 0.27 absorbance units, consistent with complete conversion of the reacted TMPAOH neutralized carboxylates to methyl ester groups.

Example 8

To a small vial was added 1mL water, 199mg of the EA/MAA copolymer suspension ($2.3 \times 10^{-4}$ equivalents of carboxylic acid), and 450mg of 10% TEPAOH in water ($2.3 \times 10^{-4}$ equivalents of TEPAOH, purchased from Pfaltz & Bauer). Neutralization of the carboxylic acid sites with TEPAOH made the polymer water soluble.

Similar to when TMPAOH was added, the carboxylate CO stretch of the neutralized polymer (film cast on CaF$_2$ from water) shifted from 1705cm$^{-1}$ to 1575cm$^{-1}$. IR absorbance from 3100-3500cm$^{-1}$ is due to water retained in the ionic polymer. The IR also contained a shoulder at 3030cm$^{-1}$ due to the aromatic C—H groups in the TEPA cation.

Heat treatment of a film of TEPAOH neutralized polymer at 95° C. for 30 mins. converted the TEPA-carboxylate to ethyl ester. This fact was established by 94% loss of the carboxylate band at 1575 cm$^{-1}$, an increase in the ester absorbance at 1735 cm$^{-1}$ and loss of the residual water. The ester absorbance increased from 0.98 absorbance units to 1.38 absorbance units, consistent with efficient conversion of the TEPAOH neutralized carboxylates to ethyl ester groups. The diethylaniline by-product diffused out of the film as evidenced by the loss of the shoulder at 3030cm$^{-1}$.

Example 9

TMPAOH could be converted to trimethylphenylammonium bicarbonate by passing CO$_2$ through the TMPAOH solution. It is likely bicarbonate solutions will be more stable than the hydroxides. Furthermore, under normal storage conditions it is possible that TMPAOH will be converted to the bicarbonate.

To a small vial was added 1mL of 1.1M TMPAOH and 1 drop of dilute phenolphthalien (in methanol). Crushed dry ice was added until the solution became colorless, indicative of TMPAOH being converted to trimethylphenylammonium bicarbonate.

To a small vial was added 1mL water, 199mg of the EA/MAA copolymer suspension (2.2×10$^{-4}$ equivalents of carboxylic acid), and 0.200mL of 1.1M trimethylphenylammonium bicarbonate in methanol (2.2×10$^{-4}$ equivalents of trimethylphenylammonium bicarbonate). Neutralization of the carboxylic acid sites with trimethylphenylammonium bicarbonate produced considerable gas (CO$_2$ released) and made the polymer water soluble.

Heat treatment of a film of trimethylphenylammonium bicarbonate neutralized polymer at 96° C. for 30 minutes completely converted the TMPA-carboxylate to methyl ester. This fact was established by loss of the carboxylate band at 1575cm$^{-1}$, an increase in the ester absorbance at 1735 cm$^{-1}$ (now a combination of methyl and ethyl ester) and loss of the residual water. The ester absorbance increased from 1.33 absorbance units to 2.0 absorbance units, consistent with complete conversion of the trimethylphenylammonium bicarbonate neutralized carboxylate to methyl ester. The dimethylaniline byproduct diffused out of the film as evidenced by the loss of the shoulder at 3030 cm$^{-1}$.

Example 10

TMSOOH was prepared by addition of excess silver oxide to a solution of trimethylsulfoxonium iodide (Aldrich) in water. The concentration of TMSOOH (0.15 molar) was determined by dilution in water and titration with HCl (phenolphthalien end point).

To a small vial was added 680mg of the EA/MAA copolymer suspension (7.9×10$^{-4}$ equivalents of carboxylic acid), and 5mL of 0.15M TMSOOH in water (7.5×10$^{-4}$ equivalents of TMSOOH). Neutralization of the carboxylic acid sites with TMSOOH made the polymer water soluble.

As with the TMPAOH neutralized polymer, the carboxylate CO stretch of the TMSOOH neutralized polymer (film cast on CaF$_2$ from water) shifted from 1705 cm$^{-1}$ to 1575 cm$^{-1}$.

Heat treatment of a film of TMSOOH neutralized polymer at 95° C. for 30 mins. converted the TMSO-carboxylate to methyl ester. This fact was established by loss of the carboxylate band at 1575cm$^{-1}$, and an increase in the ester absorbance at 1735cm$^{-1}$.

Example 11

(Methoxymethyl)triethylammonium chloride was made by addition of 40g triethylamine to 25g of chloromethyl methyl ether in 130mL dichloromethane. A 7.8g portion of the resulting salt (dried under vacuum) was reacted in 40mL water with 5.6g silver oxide to produce after filtration a solution of (methoxymethyl)triethylammonium hydroxide, 0.92M. The copolymer of Examples 1-10 (193mg of a 30% solids mixture) was diluted by 1 mL water and neutralized with 238mL of the hydroxide solution. A film was cast on a CaF$_2$ window, and IR showed the carboxylate band at about 1575 cm$^{-1}$ was comparable in absorbance to the ester band at 1735cm$^1$. After treatment at 95° C. for 30mins., the carboxylate band was apparently gone, and the ester band was relatively more absorbing. A similar sample kept at 80° C. for 20 mins. was more than 90% reacted.

What is claimed is:

1. A process for forming alkyl esters in polymers, comprising, maintaining a polymer containing carboxylate ions, whose counterions are esterifying ammonium or sulfoxonium ions at a temperature of about 0°C. to about 200° C., and in the substantial absence of water and other solvents capable of string hydrogen bonding, and provided that said ammonium or sulfoxonium ions are substantially stable in the presence of water.

2. The process as recited in claim 1 wherein said counterion is selected from the group consisting of ammonium ions Of the formula $R^1R^2R^3R^4N^+$ where $R^1$, $R^2$ and $R^3$ are independently alkyl containing 1 to 6 carbon atoms and $R^4$ is phenyl or alkyl containing 1 to 6 carbon atoms; and sulfoxonium ions of the formula $R^5R^6R^7SO^+$ where $R^5$, $R^6$ and $R^7$ are independently alkyl containing 1 to 6 carbon atoms.

3. The process as recited in claim 1 wherein said counterions are selected from the group consisting of tetramethylammonium, phenyltrimethylammonium and trimethylsulfoxonium.

4. The process as recited in claim 1 wherein said counterions are di- or higher functional.

5. The process as recited in claim 4 wherein said counterions are difunctional.

6. The process as recited in claim 5 wherein said polymer contains 2 carboxylate ions.

7. The process as recited in claim 1 wherein said counterions are monofunctional.

8. The process as recited in claim 1 wherein said temperature is 15° C. to about 150° C.

9. The process as recited in claim 1 wherein said temperature is 25° C. to about 130° C.

10. The process as recited in claim 1 wherein said carboxylate has a conjugate acid whose pKa is 2 or more.

11. The process as recited in claim 1 wherein said polymer is an acrylic or styrenic polymer or a acrylicstyrenic copolymer.

12. The process of claim 1 carried out in a film or coating.

13. The process of claim 1 carried out in an automotive coating.

* * * * *